A. O. DUPUY.
MOLD DUMPING MACHINE.
APPLICATION FILED DEC. 20, 1912.

1,227,763.

Patented May 29, 1917.
9 SHEETS—SHEET 1.

FIG. 1.

WITNESSES:
Oliver M. Kappler
Horace B. Fay

INVENTOR
Arthur O. Dupuy
BY
Fay and Oberlin
ATTORNEYS

A. O. DUPUY.
MOLD DUMPING MACHINE.
APPLICATION FILED DEC. 20, 1912.

1,227,763.

Patented May 29, 1917.
9 SHEETS—SHEET 2.

WITNESSES:
Oliver M. Kappler
Horace B. Fay

INVENTOR
Arthur O. Dupuy
BY Fay and Oberlin
ATTORNEYS

A. O. DUPUY.
MOLD DUMPING MACHINE.
APPLICATION FILED DEC. 20, 1912.

1,227,763.

Patented May 29, 1917.
9 SHEETS—SHEET 3.

WITNESSES=
Oliver M. Kappler
Horace D. Fay

INVENTOR
Arthur O. Dupuy
BY Fay and Oberlin
ATTORNEYS

A. O. DUPUY.
MOLD DUMPING MACHINE.
APPLICATION FILED DEC. 20, 1912.

1,227,763.

Patented May 29, 1917.
9 SHEETS—SHEET 4.

WITNESSES:
Oliver M. Kappler
Horace D. Fay

INVENTOR
Arthur O. Dupuy
BY Fay and Oberlin
ATTORNEYS

A. O. DUPUY.
MOLD DUMPING MACHINE.
APPLICATION FILED DEC. 20, 1912.

1,227,763.

Patented May 29, 1917.
9 SHEETS—SHEET 6.

A. O. DUPUY.
MOLD DUMPING MACHINE.
APPLICATION FILED DEC. 20, 1912.

1,227,763.

Patented May 29, 1917.

FIG. 13

UNITED STATES PATENT OFFICE.

ARTHUR O. DUPUY, OF CLEVELAND, OHIO, ASSIGNOR TO THE C. O. BARTLETT & SNOW COMPANY, OF CLEVELAND, OHIO, A CORPORATION OF OHIO.

MOLD-DUMPING MACHINE.

1,227,763.

Specification of Letters Patent.

Patented May 29, 1917.

Application filed December 20, 1912. Serial No. 737,781.

*To all whom it may concern:*

Be it known that I, ARTHUR O. DUPUY, a citizen of the United States, and a resident of Cleveland, county of Cuyahoga, State of Ohio, have invented a new and useful Improvement in Mold-Dumping Machines, of which the following is a specification, the principle of the invention being herein explained and the best mode in which I have contemplated applying that principle, so as to distinguish it from other inventions.

The present invention relates to a machine to be used in brick making, which will transport the bricks in the molds from the compressor, will invert the same, placing a pallet on top of the mold, and after inverting, will remove the mold from the bricks, leaving the latter upon the pallet, when they may be conveyed to the drying room. The machine is also adapted to return the emptied molds to a point adjacent the compressor and to sand them during such return. I am aware that other machines of the same general type have been employed, but the present machine is not only simpler than any heretofore used, but also performs more operations which have before been done by manual labor. To the accomplishment of these and related ends, said invention, then, consists of the means hereinafter fully described and particularly pointed out in the claims.

The annexed drawings and the following description set forth in detail, certain mechanism embodying the invention, such disclosed means constituting, however, but one of various mechanical forms in which the principle of the invention may be used.

In said annexed drawings:—

For the purpose of convenient description and clearness, I will describe my machine by taking up the several parts separately, thus (1) the feeding and pallet placing mechanism; (2) the inverting mechanism; (3) the removing conveyer mechanism; (4) the bumping mechanism; (5) the hoisting mechanism for removing the mold from the bricks; (6) the returning conveyer mechanism for transporting the emptied and hoisted molds into the discharging mechanism, which is here shown as a part of the mold inverting mechanism; and (7) the mold sanding mechanism.

The general construction of the frame for my machine may, of course, be of any suitable type, and the frame here shown is not the only design which might be used. The frame is preferably of iron, and is composed of angle-irons which are riveted together as shown. Two curved members 2 rest upon the floor or ground, and cross-members 3 connect the same together. Uprights 4 are attached at suitable points to the members 2 and 3, and extending between these uprights there are other angle-irons 5 for the purpose of strengthening the frame. Those portions of the frame which are adapted to coöperate with the various mechanisms will be described in detail at the proper point.

Figure 10:
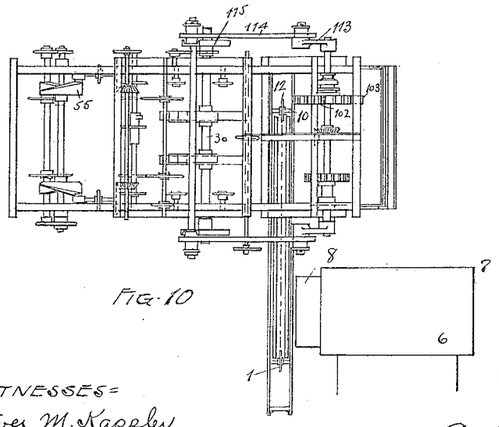
Fig. 10 is a plan view, showing the relation of my machine to a brick compressing machine, which is shown in outline only.

Before describing the various operations which are performed in the machine, attention is called to Fig. 10, in which a plan view of the machine is shown, and its position with relation to a mold compressor 6. This compressor is of rectangular form, as indicated, the mold boxes being placed in the machine at its head end 7, when they are filled with clay by means of the compressing mechanism, and are then discharged onto the narrow platform 8 at the left. The boxes are discharged directly onto the mold dumping machine from the compressor, a suitable conveyer receiving them, as will be hereinafter described. After the molds have been emptied, and the boxes sanded, they are discharged from the mold dumping machine at the front end of the same, when an operator will place them in the brick compressor, or they may be discharged directly onto a conveyer. It has heretofore been impossible to make more than a certain number of brick per hour, since an operator was obliged to bump the molds when filled, in order to loosen the brick from the mold, and it was not possible for this man to do more than a certain amount of work per hour. The other operations to be performed could, of course, be speeded up by suitable mechanism, but the impossibility of a single operator handling more than a certain number of molds did not permit of any increased speed. By performing the bumping by machinery it is possible for an operator to handle a much greater number of molds, since one operation which he has to perform is eliminated.

Figure 1:
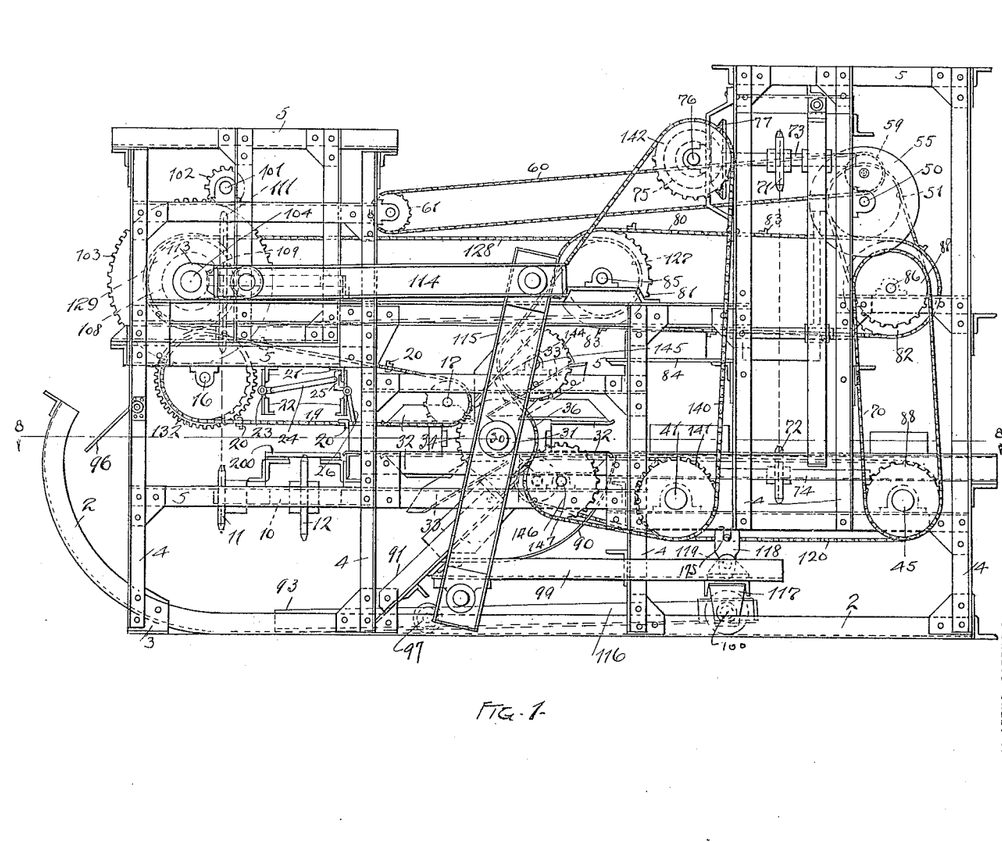
Figure 1 is a side elevation of my machine.
Figure 2:
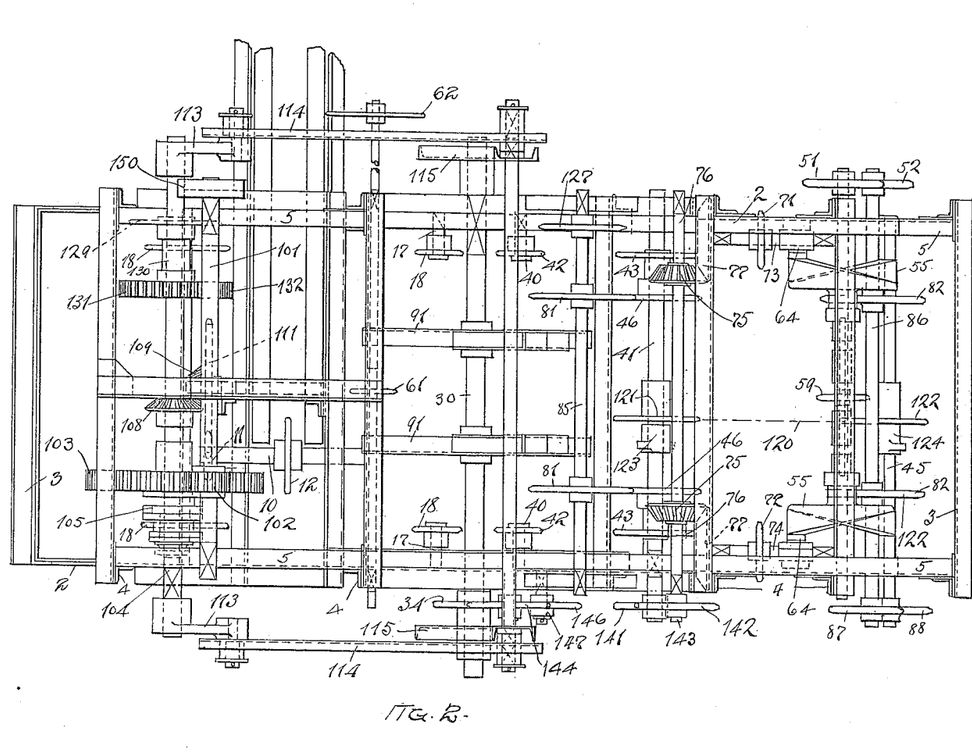
Fig. 2 is a plan view of the same.
Figure 3:
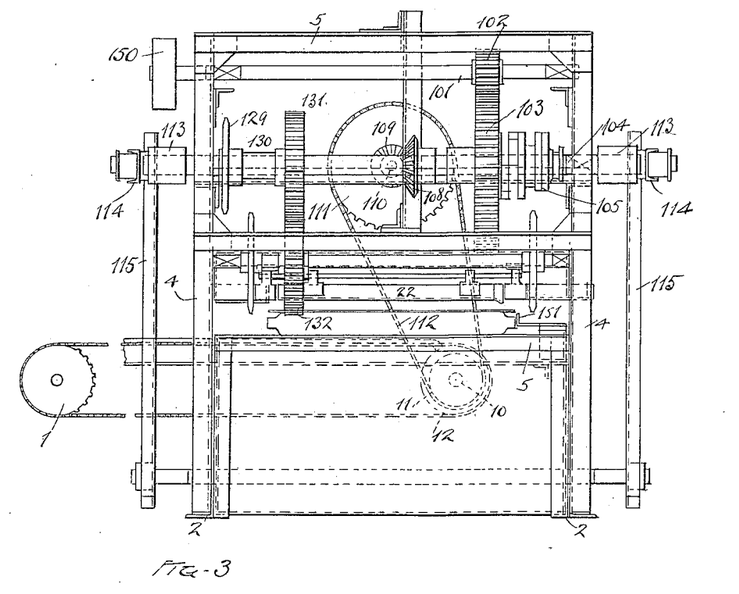
Fig. 3 is a rear end elevation.

Referring to Figs. 1, 2 and 3, it will be seen that there is a shaft 10, mounted parallel with the side members 2 of the machine, and bearing a gear 11 and a sprocket or gear 12. Upon the gear 12 is mounted a conveying chain 200 of the usual type, which runs from that gear to a second gear 1 which is mounted adjacent to the brick compressor. The gear or sprocket 1 is mounted adjacent to the mold discharging ledge or platform 8 of the brick compressor and is disposed at such a height that the conveyer operated by gears 1 and 12 will be at substantially the same level. The filled mold boxes issue from the compressor at given intervals and are discharged onto the conveyer at once if the ledge is narrow, or at a later period if the platform accommodates more than one mold box. The point is immaterial, as in either case mold boxes are fed onto the conveyer at stated intervals. The shaft 10 will be driven through the gear 11, the exact disposition of the drive mechanism being fully explained hereinafter. The type of mold boxes which are used is shown in Fig. 3. It will be seen that these boxes are of rectangular shape and are several inches in depth, having handles at either end. As a mold is brought into my machine by the conveyer, as has already been described, one end of the mold will strike against a stop 151 mounted on one of the members of the frame.

*Mold feeding and pallet placing mechanism.*

Mounted above the conveyer already described is a feeding mechanism which comprises two parallel shafts 16 and 17 rotatably mounted in the side members of the frame and bearing gears 18, upon which are carried two chains 19, these chains having lugs 20 attached thereto at suitable intervals. These lugs are so disposed that as the chain is moved by means of the gears they will engage the side of the mold box and will carry the same to the position shown in Fig. 1.

Attached to one of the frame members adjacent to this conveyer are two depending angles 21, to which are pivotally attached open brackets 22 adapted, in their normal position shown in Fig. 1, to receive a pallet. Attached to one of the brackets 22 is a projection 23, to which is pivotally attached a bar 24 attached to a member 25 fixed to, and operated by, an oscillatory tripping lever 26, which is also attached to the other end of the open brackets 22. As one pair of lugs 20 convey a mold box into the position shown in Fig. 1, they also engage the tripping lever 26, thus oscillating the brackets 22 outwardly and permitting the pallet held thereon to fall upon the next succeeding mold box. The members 25, 26, and the right hand bracket 22, are in a fixed relation to each other, all being pivotally mounted to swing together.

*Mold inverting and discharging mechanism.*

Rotatably mounted in suitable bearings held in the side members of the frame is a shaft 30, upon which is rotatably mounted sleeves 31. Attached to the shaft are two pairs of radially outwardly extending and oppositely disposed jaws 32. Each pair of these jaws is adapted to receive a mold box with a pallet placed thereon. Other pairs of mold receiving jaws 33 are also attached to the shaft 30, but the latter do not extend radially outward as do the first named jaws 32. The jaws 33 are adapted to receive the emptied mold-boxes and to remove them to the sanding mechanism, as will be fully described hereinafter. When a mold has entered the jaws 32 from the feeder, the shaft is rotated through one-half a revolution, thus inverting the mold box upon the pallet and placing these in the position shown at the right side of Fig. 1. The four pairs of jaws form a spider and constitute the mold inverting mechanism. The shaft is rotated through gears 34 attached thereto, said gears being driven by a chain 140, as will be described hereinafter.

*Mold removing conveyer.*

For the purpose of removing the inverted molds, I provide conveying mechanism which comprises shafts 40 and 41, upon which are mounted gears 42 and 43 respectively, bearing conveying chains 47. These chains will have suitable cross-pieces, and will be of the usual type of conveyers used for this purpose. The exact construction of this conveyer is not of interest in the present application, since it is not considered to be a part of the invention. A second conveyer is provided for the purpose of transporting the molds farther along in the machine, and comprises the shaft 41 already mentioned, and a second shaft 45 parallel thereto. Gears 46 are fixed to these shafts and are operated thereby. Conveyer chains 48, similar to the one used on the first described conveyer, will be used on these two removing conveyers respectively. They will be operated simultaneously with the mold feeding and pallet placing mechanism, and will only operate during the intervals of rest of the mold inverting mechanism.

The means for producing the intermittent action of the various mechanism will be explained hereinafter. It is sufficient at this point to describe the various mechanisms and to discuss their functions in order that a general understanding of the machine as a whole may be obtained before taking up the driving mechanism, which is not complicated, but is confusing on account of the number of shafts, many of which are in vertical or horizontal alinement and bear gears which are substantially equal in size and similar in disposition. The various conveyers used might be described in greater detail, but it is not considered necessary to do so, as they are of a common type largely used in machines of various sorts, and are in themselves no part of the present invention.

Bumping mechanism.

Figure 4:
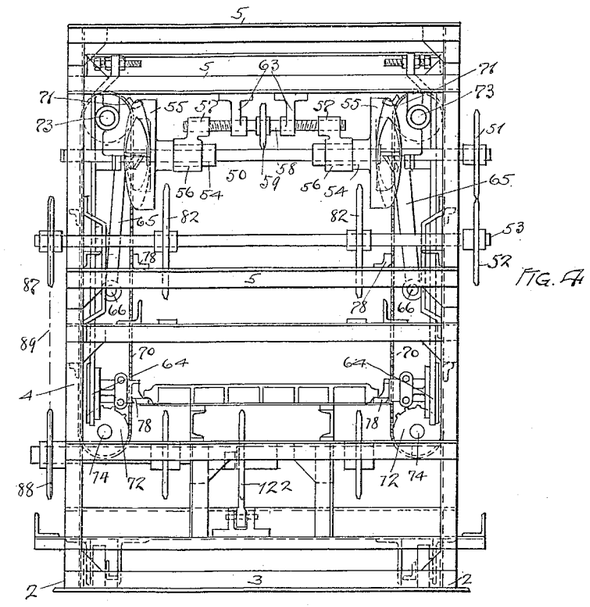
Fig. 4 is a front end elevation.
Figure 5:
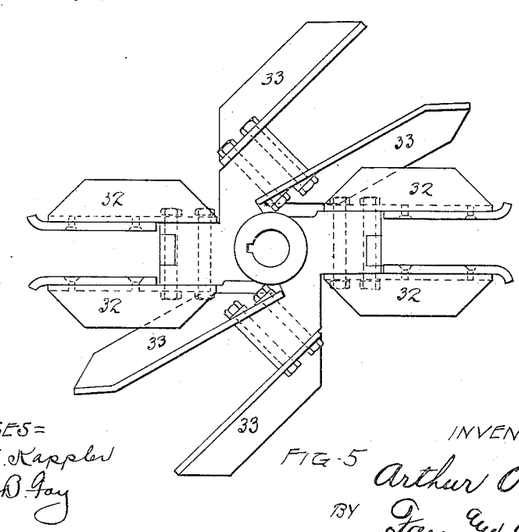
Fig. 5 is a side elevation of the mold inverting mechanism.

As the molds are carried to the right hand side of the machine, from the spider, by the conveying mechanism, as has been already described, they are brought to a stop by the action of the conveying mechanism, which moves intermittently through a short distance only. The mold, when so stopped, will be in the position shown in Fig. 4. The bumping mechanism will then act to strike the two ends of the mold a sharp blow, thus loosening the bricks from the mold, and rendering it possible to freely draw the mold from off the bricks, which may then be conveyed to the drying room.

The bumping mechanism comprises a shaft 50, mounted in the upper part of the frame, and driven through a gear 51, meshing with a gear 52 driven by a shaft 53. Upon this shaft 50 are slidably mounted two sleeves 54 which bear cams 55, and which may be moved slidably along the shaft by means of collars 56 which have apertured upstanding lugs 57 engaged by a threaded adjusting member 58 which may be rotated by a gear 59 driven by a chain 60 running over a gear 61 at the forward end of the machine, and operated by a hand wheel 62 which is shown in Fig. 2. The adjusting member 58 is supported by brackets 63 which extend downwardly from an upper member of the frame.

Pivotally mounted on the upper part of the frame are two bumping hammers 64 which are actuated by the cams through intermediate levers 65, the latter oscillating on pins 66 mounted centrally in the frame. The cams are so timed that, as the conveying mechanism comes to a stop, they will simultaneously strike the intermediate levers, causing these to actuate the bumping hammers which will strike the ends of the molds a sharp blow. By means of the adjusting mechanism the intensity of the blow may be varied, but not the timing of the cams, as the sleeves 54 attached thereto are fixed to rotate with the shaft 50. Thus the operator who will stand at the forward end of the machine, within reach of the hand wheel, can inform himself of the condition of the bricks as they go through the machine in the molds, and can vary the intensity of the blow upon the mold to suit the conditions. Adjustable stops 151 are provided on the upwardly extending ends of the bumping hammers, these stops limiting the swing of the hammers by striking against the cross members of the frame.

Hoisting mechanism.

The hoisting mechanism comprises two hoisting chains 70 which are operated by gears 71 and 72 mounted on the shafts 73 and 74, the two upper shafts 73 being driven through bevel gears 75 on a shaft 76, meshing with the bevel gears 77 on the shafts 73. The two lower gears 72 are not driven directly, but merely through the hoisting chain running over the gears 71. At suitable intervals upon this hoisting chain are lugs or ears 78 which engage the under sides of the handles on the mold, thus raising the mold smoothly from off the bricks, and leaving these upon the pallet which rests upon the now stationary conveyer. The pallets and the bricks will be removed by a suitable conveyer running to the drying room, which need not be described.

The hoisting mechanism will be driven intermittently and will only act after the removing conveyer has operated to bring a mold to the bumping mechanism, which must, of course, also have acted to loosen the brick in the mold. The means for securing this intermittent action will be further described under "driving mechanism."

Since the action of the hoist is intermittent, it follows that in the intervals of rest molds will be held at various elevations by the hoisting chain with its lugs. The mold which is at the highest position may be removed laterally from the hoist, and means for so doing will now be described.

Returning conveyer.

After the mold boxes have been hoisted they are engaged by the returning conveyer, comprising conveyer chains 80 running over gears 81 and 82, mounted on shafts 85 and 53 respectively, the last-named shaft being driven by gears 87 and 88 attached respectively to shafts 53 and 45 and connected by a suitable chain 89, the first-named shaft being driven from the shaft 45. The conveyer chains 80 have outwardly extending lugs 83 which are adapted to engage the sides of the mold box and to force the same onto guides 84, from which the mold boxes will be pushed into the jaws 33 of the spider. This returning conveyer will be operated intermittently and will operate at the same time that the mold removing conveyer and the bumping mechanism act.

Mold discharging mechanism.

As the molds are forced from off the guides 84 by the returning mold conveyer, they fall between the jaws 33 of the spider. It will be seen that the spider serves two purposes. It inverts the molds and also receives the molds when empty, and, upon rotation, discharges the molds at the proper point. The jaws 33 are not parallel, and it is possible for a mold box to slip from between the same, which will be the action as each side of the jaws 33 rotate below the horizontal. The mold boxes will be prevented from entirely passing out from between these jaws by means of guides 90, which are curved, and are disposed concentrically with respect to the shaft 30. These guides may be suitably formed of angle-irons, and will be attached to the frame members at the desired points. The angle-irons 90 will extend through substantially a quarter of a circle, and thus the molds will be free to drop from between the jaws 33, as these pass the vertical on the downward swing. The mold boxes will then slide down two guides 91 which are disposed at an angle to the horizontal, and leading to the two longitudinal lower members of the frame.

As the spider is at rest during the action of the returning conveyer, the mold boxes will, of course, enter the jaws 33 at the proper instant, and no other boxes will be brought to the spider during the rotation of the same, since during this interval the conveyer mechanism is not operated.

Sanding mechanism.

It is desirable to sand the empty mold boxes before they are returned to the brick compressor, since this prevents any undue sticking of the brick to the sides of the mold, and makes for a free removal of the mold from the bricks. Between the curved ends of the frame members 2 there will be a metal sheet 95, and in this open chamber there will be a quantity of sand through which the empty mold boxes will be forced. The molds are forced through the sand against the curved frame members 2 which are given the curvature shown, thus inverting the molds which fall away from the guides to rest upon the apron or table 96 attached to the uprights of the frame. An operator is stationed at this point to tap the molds, thereby shaking out any superfluous sand, and to feed the boxes to the compressor or to a conveyer if one be desired at this point.

The means for forcing the molds up the curved guides 2 comprise a mold pusher consisting of two bars 93 and a cross-bar 94 between the same, the bars 93 being provided with wheels 97 and 98 operating upon the guides 2, the bars and wheels forming a carriage 116 operated by cranks 99 pivotally attached to the axle 100 of the wheels 98. Means for operating the crank will be described hereinafter.

As the carriage is reciprocated forward, the mold pusher 94 is adapted to receive thereupon a mold box which will be discharged from the guides 91, and at the same time is adapted to push forward a mold which is shown in dotted outline in the guides. Other molds, also shown in dotted lines, will be forced up the inclined guides by this action, thus causing them to pass through the sand. When the molds are discharged upon the table 96 an operator will remove them, and will place them in the brick compressor, as has been already mentioned.

Driving mechanism.

The primary drive shaft 101 is disposed in the upper part of the frame, and outside of the same will have fixed thereon a pulley or gear 150 which may be driven by any means. Such primary driving shaft bears a gear 102 which meshes with a large gear 103, freely mounted on a secondary driving shaft 104. Such gear may be attached to the shaft by means of a suitable clutch 105.

Upon the secondary driving shaft there is mounted a bevel gear 108 which meshes with and drives a second smaller bevel gear 109 fixed to rotate the shaft 110, mounted at right angles to the secondary driving shaft. Upon this shaft 110 there is fixed a gear 111 which drives, by means of a chain 112, the conveyer which brings the molds to the present machine. In Fig. 1 this gear 111 is shown, and directly below it the smaller gear 11, which will be driven thereby and which will drive the conveyer already described. It will be seen that so long as the secondary driving shaft is being rotated the conveyer will be operated, and this operation will continue as long as the dumping machine is in use.

Figure 11:
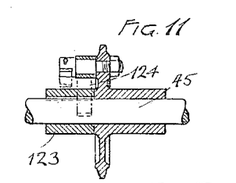
Fig. 11 is a section on the line 11—11 in Fig. 12.
Figure 12:
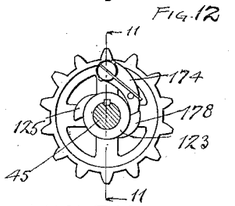
Fig. 12 shows a detail of construction.
Figure 13:
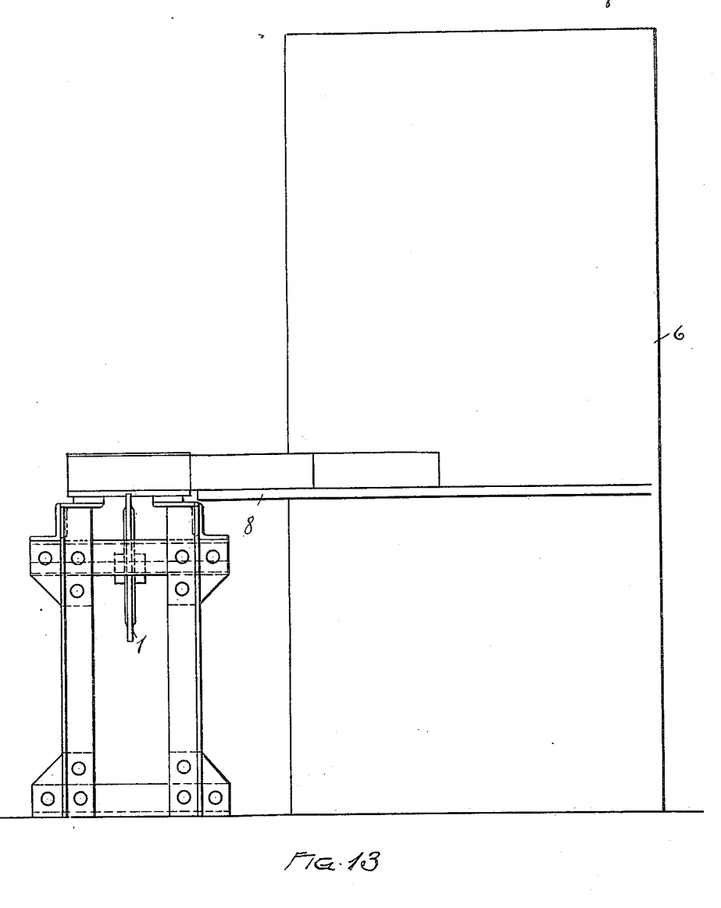
Fig. 13 is an elevation showing the relative disposition of the compressor and conveyer running to the mold dumping machine.

At either end of the secondary driving shaft there are attached cranks 113 which drive connecting rods 114 pivotally connected to the upper ends of rocking levers 115 attached to the sleeves 31. Thus it will be seen that rotation of the secondary driving shaft causes a rocking motion to be imparted to the levers 115, which are pivotally attached to the cranks 99, which in turn reciprocate the carriage 116 forward and backward along the guides. Attached to a frame 117 mounted on the carriage is a clamping jaw 118 attached to the frame 117 by means of a pin 119. The clamping jaw engages the chain 120 carried on gears 121 and 122 on the shafts 41 and 45 respectively, which drive the shafts 41 and 45, or rather the two sleeves 123 and 124 which are mounted on these shafts, and which thus drive the shafts. The jaw engages the chain 120 through a pin 175 attached thereto and designed to carry a certain load only, and upon any overloading this pin will break, thus releasing the chain and stopping all further action of the machine actuated by the carriage. The purpose of this action is, of course, to prevent any damage to the machine caused by a sudden stopping of some part. The shaft 45 will be driven by the sleeve 124 carried thereby, and shown in detail in Figs. 11 and 12. The gear 122 is driven by the chain 120 in a clockwise direction only, such action being secured by means of the pawl 174 which will engage one of the two ratchet teeth 178 when being driven in one direction, but will slide over the same when rotated in the opposite direction. The shaft 41 will be rotated in a counter-clockwise direction only by similar means, although the pawl and teeth are here reversely disposed to secure a counter-clockwise movement. Since the construction of the pawl and ratchet mechanism is clearly shown in Figs. 11 and 12, it is not thought necessary to further complicate the drawings by including these members on the various sheets, as it will be readily seen how such action of these two shafts may be obtained. The gears 43 and 46 are connected by a sleeve 126 which allows action of the two removing conveyers, upon movement of the carriage from left to right through the shaft 45.

Figure 6:
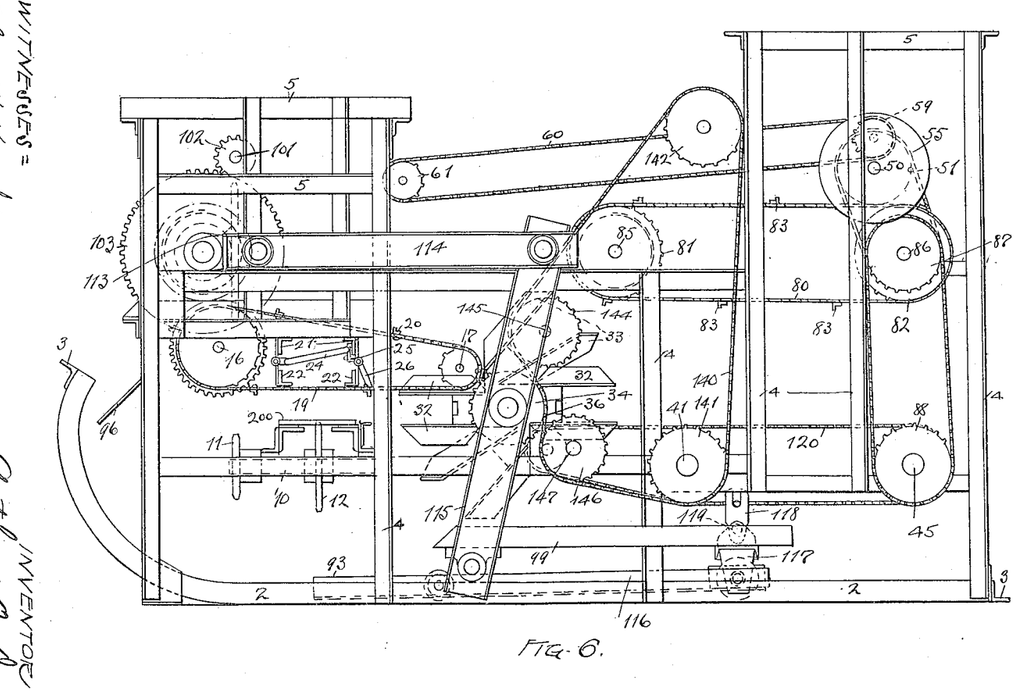
Fig. 6 is a side elevation showing the operating mechanism for performing certain of the functions of the machine which will be hereinafter more fully described.

Upon the return movement of the carriage, that is, from left to right, the shaft 45 will be picked up by the pawl and ratchet mechanism, and will be rotated in a clockwise direction. This will result in a rotation of the gears and shafts which are shown in Fig. 6. The shaft 45 drives the conveyer chains 47 and 48, thus removing a mold from the spider and bringing one to the bumping mechanism, which is timed to at once operate, being driven by shaft 50 through gears 51 and 52, the latter rotating with shaft 53 driven by a chain 89 connecting gears 87 and 88. Gear 88 is on shaft 45 and is driven by the same upon the movement of the carriage just described. Rotation of shaft 53 operates the returning conveyer 80 through gears 81 and 82, thus bringing an emptied mold to the jaws 33 of the spider. It will thus be seen that upon a return movement of the carriage, that is, from right to left, the removing conveyers will operate, and also the bumping mechanism and the returning conveyers. From one of the shafts which bear the gears carrying the returning conveyer chains, the feeding mechanism, and from that the pallet placing mechanism, will be operated as will now be described. Such movement of the carriage will also operate the mold pushing mechanism 94 to force the mold away from the guides 91 and up the inclined frame members 2 through the sanding pile. Upon this movement of the carriage the feeding mechanism will also be driven through the shaft 85 which bears a gear 127 connected by a chain 128 with a gear 129 attached by a sleeve 130 to a gear 131 which meshes with and drives a gear 132 attached to the shaft 16. The sleeve 130 is rotatably mounted on the secondary driving shaft. Action of the shaft 16 operates the feeding conveyer chains 19.

Figure 7:
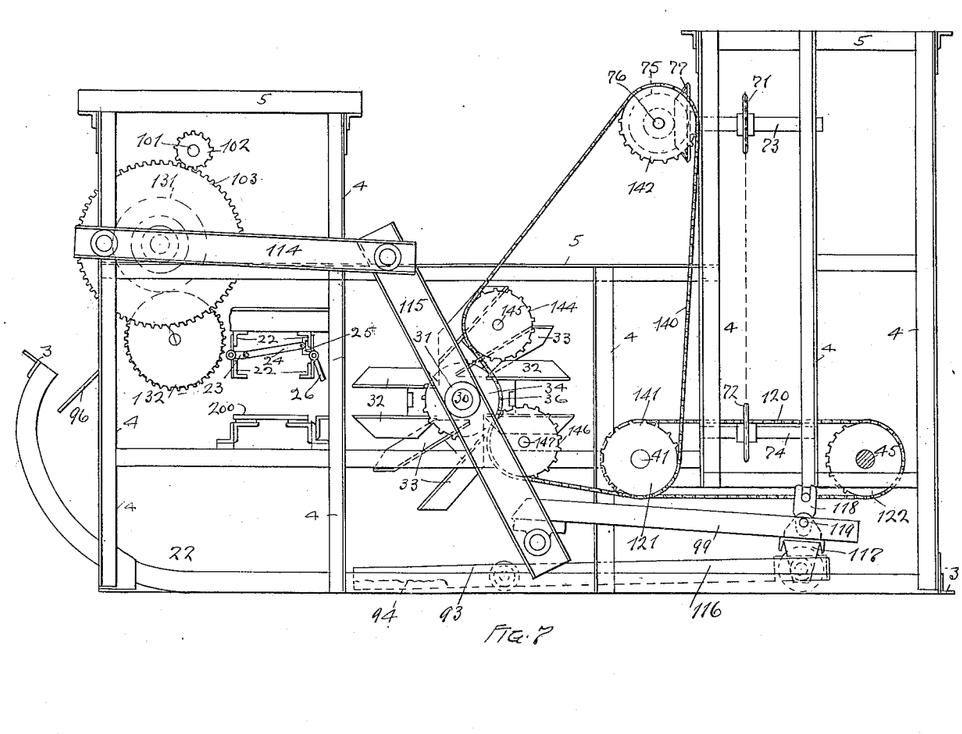
Fig. 7 is an elevation similar to Fig. 6, showing the mechanism for performing the remainder of the operations.
Figure 8:
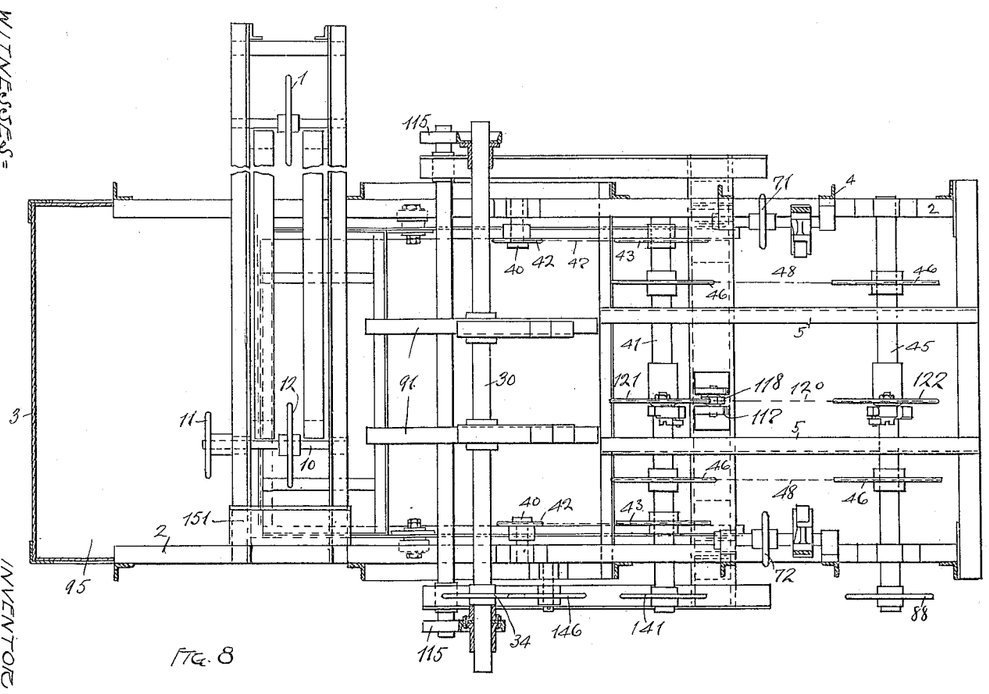
Fig. 8 is a section taken on the line 8—8 in Fig. 1.
Figure 9:
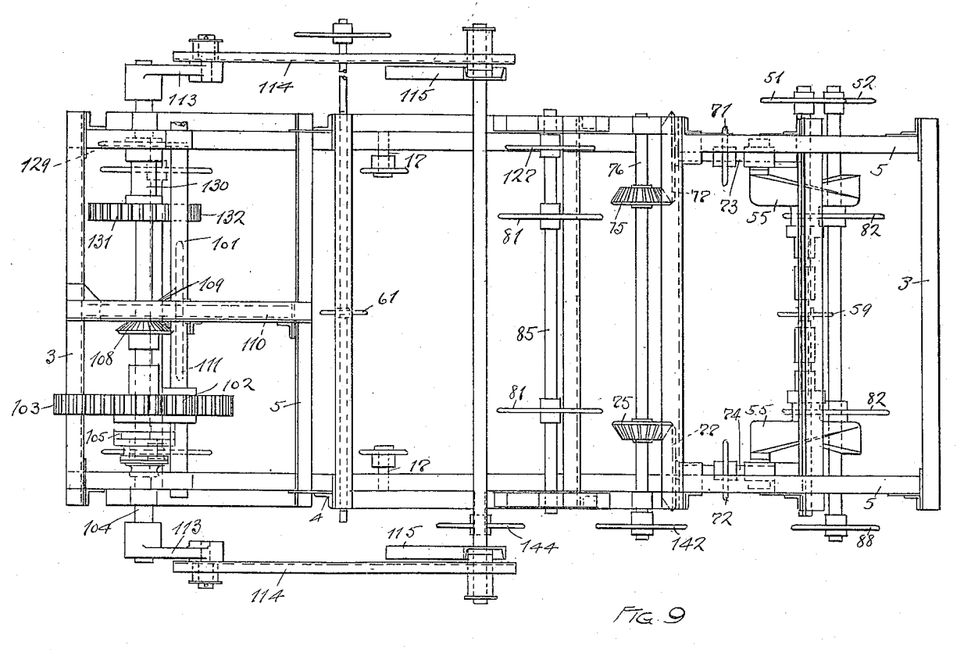
Fig. 9 is a plan view of the machine, stopping, however, at the line 8—8 in Fig. 1.

A forward movement of the cariage, that is, from left to right, will pick up the shaft 41 which will operate a chain 140 running over a gear 141 fixedly attached to the shaft 41. The chain 140 runs over a gear 142 carried by the shaft 143 to which are attached bevel gears 75 driving the hoisting conveyer 70. From the gear 142 the chain runs over an idler 144 mounted on a shaft 145, and from this gear to a gear 34 attached to the shaft 30 which bears the spider comprising the radial jaws for holding the mold boxes. From the gear 34 the chain runs over a gear 146 rotatably mounted on a shaft 147, and from this gear around the original driving gear 41. The operations which will take place upon the forward movement of the carriage are therefore the hoisting of an emptied mold box, the rotation of the spider through one-half revolution, thus inverting a filled mold which has been placed in the jaws 32 shown at the left in the various side elevations and bringing a mold box which has been placed in the upwardly extending jaws 33 onto the guides 91, from which the mold box will slide onto the frame guides 2 upon the removal of the mold box already there by the action of the mold pushing mechanism upon a forward movement of the pusher which takes place during the operations described in the preceding paragraphs. During the operation of the carriage which has just been described, the mold pushing mechanism 94 will be returned to the position shown in Fig. 7.

It will be noticed that the various gears used are of substantially the same size. In this way a forward movement of the carriage results in a substantially equal movement of all the mechanisms which are driven thereby, thus resulting in a constant procession of molds through the machine and preventing any gathering of the molds in any one mechanism at any one time. The rearward movement of the crank, producing rotation of the various shafts, causes an equal movement of the molds carried by these mechanisms, since all of the gears on these shafts are also substantially equal in size, whereby a given movement of the carriage will produce an equal movement in each of these mechanisms.

The general operation of the machine will now be taken up. The main driving shaft 101 is driven through any suitable external means, thus rotating the gear 103 attached to the shaft 104 by means of the clutch 105. Operation of this shaft will drive the mold feeding conveyer through the bevel gears 108 and 109, thus operating the chain 112 which drives the shaft 110 which operates the feeding conveyer. The action of the feeding conveyer is therefore continuous. A suitable stop 150 contacting the mold boxes as they are brought to the proper position beneath the pallet placing mechanism, and retaining them in such position until they are removed by the conveyer running to the spider. Rotation of the shaft 104 operates the connecting rod 114, thus driving the rocking lever 115 which operates the carriage 99, as will be readily seen. From the carriage 99 all of the other movements of the mechanism are controlled, as has already been described in detail, movement of the carriage in each direction operating certain mechanisms which are allowed to remain at rest during the other movement of the carriage which operates the remainder of the mechanisms.

As a mold box is brought to the position shown in Fig. 3 it is removed to the jaws 32 of the spider by the conveying mechanism bearing chains 19, a pallet being dropped upon the top of the mold box as it drops beneath the brackets 22. The mold box, after being brought to the jaws 32, is inverted by the rotating action of the spider, and will be removed when inverted by the conveying chains 44 and 47 and 48 to the position shown in Fig. 4, when the mold box will be bumped at either end by the bumping hammers, thus freeing the bricks from the sides of the mold and permitting the mold box to be hoisted by the chains 70 until it is in a position to be removed by the returning conveyer chains 80 to the platform 84, and from this to the jaws 33 of the spider. Upon the removal of the mold box from the bricks the latter may be transported from the present machine to any suitable place of storage by mechanism which need not be described, as it is of no importance in the present connection. The rotation of the spider will carry the mold box which has been placed in the upwardly extending jaws 33 to the guides 91, from which it will slide onto the mold pusher 94 which will operate to force the emptied mold box through the sand onto the table 96 from which it may be removed by the operator and returned to the brick compressor.

It will be understood that the various mechanisms, such as the conveyers, which operate intermittently, will, in the normal operation of the machine, transport at any one time a plurality of mold boxes which will be spaced from each other by definite intervals. Various details of construction, both in the frame of the machine and in the disposition and arrangement of the various shafts and gears, may be changed as desired, provided the main function of the machine which is to invert, empty and return a mold box is carried out.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of an intermittently operating mold inverting mechanism adapted to receive and invert a mold; an intermittently operating conveying mechanism adapted to remove such mold from said inverting mechanism when the same is at rest; means mounted above a portion of said conveying mechanism and adapted to bump said mold and thereby loosen the brick therefrom, said means being timed to operate upon the coming to rest of said intermittent conveying mechanism; and lifting means also mounted above a portion of said conveyer and adapted to lift said mold from the brick following such bumping operation.

2. In a machine of the character described, the combination of a mold inverting mechanism adapted to receive molds at either of two elevations; a feeder adapted to supply filled molds to said mechanism at the lower of such two elevations; a conveyer adapted to remove molds from said inverting mechanism; bumping means adapted to bump said molds when upon said conveyer, thereby loosening them from the brick; and means adapted to lift said mold from the brick and return them to said inverting mechanism at such second elevation.

3. In a machine of the character described, the combination of a mold inverting mechanism adapted to receive molds at either of two elevations; a feeder adapted to supply filled molds to said mechanism at the lower of such two elevations; a conveyer adapted to remove molds from said inverting mechanism; bumping means adapted to bump said molds when upon said conveyer, thereby loosening them from the brick; a sanding mechanism disposed beneath said inverting mechanism; and means adapted to lift said mold from the brick and return them to said inverting mechanism, the latter being adapted to discharge such emptied mold into said sanding mechanism.

4. In a device of the character described, the combination of an intermittently operating mold inverting mechanism adapted to receive and invert a mold; a conveying mechanism adapted to supply a mold to said inverting mechanism; a second conveying mechanism adapted to remove the inverted mold from said inverting mechanism; means for removing such mold from the bricks therein; and other means for returning such empty mold in the same vertical path traveled by such filled mold.

5. In a device of the character described, the combination of an intermittently operating mold inverting mechanism adapted to receive and invert a mold; a conveying mechanism adapted to supply a mold to said inverting mechanism; a second conveying mechanism adapted to remove the inverted mold from said inverting mechanism; means for removing such mold from the bricks therein; sanding mechanism disposed on the side of said inverting mechanism adjacent said first-named inverter; and other means for returning such empty molds to said sanding mechanism in the same vertical path traveled by such filled mold.

6. A mold inverter comprising a spider provided with a plurality of mold receiving jaws, some of such jaws being adapted to receive filled molds and others empty molds.

7. A mold inverter comprising a spider provided with radially extending jaws adapted to horizontally receive a filled mold, and having other jaws adapted to receive an empty mold from above.

8. A mold inverter comprising a spider provided with radially extending jaws adapted to horizontally receive a filled mold, and having other jaws positioned to receive an empty mold at an angle to the horizontal when said first-named jaws are horizontally receiving a filled mold.

9. A mold inverter comprising a spider provided with radially extending jaws adapted to horizontally receive a filled mold, and having other jaws positioned to receive empty molds at an acute angle to the horizontal when said first-named jaws are horizontally receiving a mold.

10. A mold inverter comprising a spider provided with radially extending jaws adapted to horizontally receive a filled mold, and having other jaws positioned to receive empty molds at an acute angle to the horizontal when said first-named jaws are horizontally receiving a mold, and a curved guideway for retaining such empty mold in such other jaws during a predetermined arc of movement by said spider.

11. In a device of the character described, the combination of an intermittently operating mold inverting mechanism adapted to receive and invert a mold, intermittently operating conveyers adapted to feed molds to, and receive molds from, said inverting mechanism; means adapted to remove the mold from the bricks therein; and means for bumping said mold prior to such removal, said last-named means being positioned and timed to operate during one of the intervals of rest of said mechanism and conveyers.

Signed by me this 29" day of November, 1912.

ARTHUR O. DUPUY.

Attested by—
 HORACE B. FAY,
 CHRISTINE E. ARNS.